Patented May 22, 1951

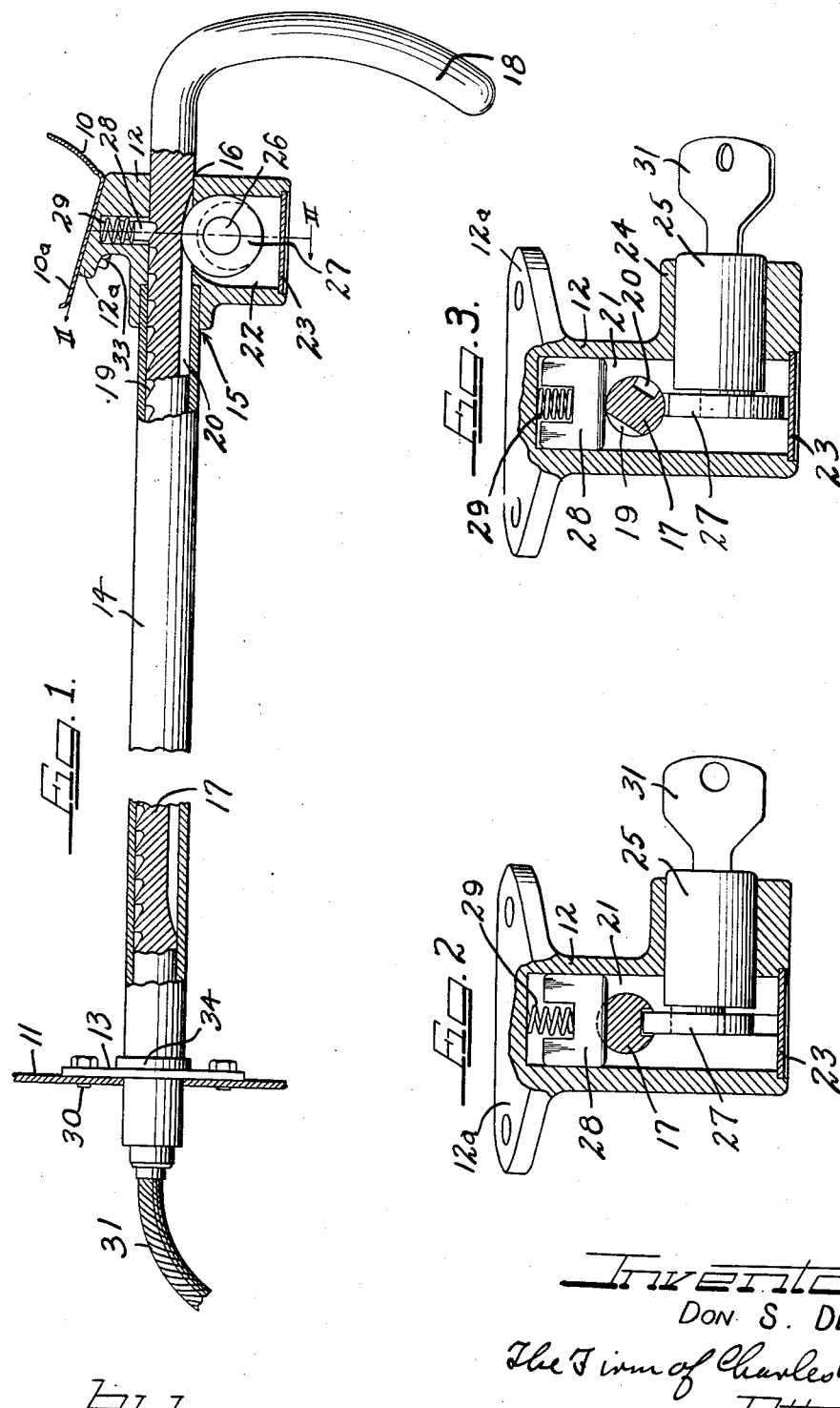

2,553,753

UNITED STATES PATENT OFFICE 2,553,753

HAND BRAKE LEVER AND LOCK

Don S. Devor, Detroit, Mich., assignor to Houdaille-Hershey Corporation, Detroit, Mich., a corporation of Michigan Application November 15, 1946, Serial No. 710,013

3 Claims. (Cl. 70—181)

The present invention relates to a hand brake lever and lock and more particularly is concerned with a lock for a push-pull type of emergency or parking brake lever construction for automotive vehicles.

There are in use at the present time automotive vehicle brake structures in which a lever is operable by pull push straight line action to set and release the brakes and in which the lever is held in brake setting position by latch means including a dog or detent engaging one of a series of notches formed as a part of the lever. In some of such constructions the lever is disconnected from the dog or detent by a turning movement of the lever about its longitudinal axis to disengage a notch from the detent, and then is retained in turned position by hand for push action to release the brakes and return the lever to its "Off" position.

An object of this invention is to utilize the supporting bracket for a brake on a vehicle below an instrument panel for housing a brake lock in a readily accessible but somewhat concealed position.

The present invention also has for an object the provision of means for locking such a lever against turning movement to release the brakes after the lever has been moved to brake setting or applying position.

Another object of the present invention is to provide means for preventing turning movement of a lever of the push-pull type to release it from its set position.

A further object of the present invention is to provide means in a straight line acting or direct pull brake lever structure for permitting movement of the lever in brake setting or applying direction while restraining the lever against turning movement to release the brakes.

A still further object of the present invention is to provide means for positively locking a push-pull brake lever against unauthorized or accidental release when the lever has been moved to set or apply the brakes.

Another and yet further object of the present invention is to provide, in a push-pull brake lever construction, a key operated cylinder lock for preventing accidental or unauthorized release of the lever when in brake applying position.

The above, other and further objects of the present invention will be apparent from the following description and accompanying drawing.

The preferred embodiment of the present invention is illustrated in the accompanying drawing and the views thereof are as follows:

Figure 1 is a fragmental, side elevational view, with parts in section, of a push-pull type brake lever showing the lever in "Off" or brake release position;

Figure 2 is a view, partially in elevation and partially in vertical section taken substantially on line II—II of Fig. 1, through the support which is attached to the instrument board of the vehicle and showing the relationship of the parts when the lever is locked against turning movement; and Figure 3 is a view similar to Figure 2 showing the relation of the parts when the lever is unlocked for releasing the brakes.

Referring to Figure 1, 10 designates the lower margin of the instrument board of an automotive vehicle, and 11 designates a portion of the dash board of the vehicle.

The instrument board 10 is formed with an inturned ledge 10a along its lower margin. A supporting member 12 having a head portion 12a may be secured to the undersurface of the ledge 10a by bolts 33, or other means.

A bearing plate 13, having an aperture therethrough, is secured to the dash board 11 by bolts 30, the dash board having an aperture therethrough in register with the aperture in the plate 13 when the same is applied in position.

A tube 14 extends from the supporting member 12 through the plate 13, and at its front end is entered in a pocket 15 formed in a supporting member 12. Normally the rear end of the tube 14 projects through the dash board 11 and the plate 13, as may be observed in Figure 1.

The supporting member 12 is formed with a horizontally disposed hole or aperture 16 through it in register with the pocket 15. Movable within the tube 14 is the brake lever or bar 17 which passes through the aperture 16 of the supporting member 12 and at its outer end is provided with a handle 18 which may be integral with the bar or may be a separate member suitably attached to the bar.

The lever or bar 17 is shown as provided with a series of ratchet teeth 19 extending along the top side of the bar and constituting a rack. A longitudinally extending slot or groove 20 is milled in the bar 17 in opposition to the rack.

The supporting member 12 is preferably formed as a die casting and as so formed has a vertical transverse slot 21 and a longitudinally extending vertical slot 22, which slots intersect. The lower end of the supporting member 12 is open and normally closed by a plug plate 23.

Integrally formed with the supporting member 12 is a laterally projecting hub 24 which carries a cylinder lock 25 with its axis horizontally disposed. The inner end of the cylinder of the lock carries an eccentrically disposed end piece 26 on which is secured a cam disc 27 which is swung about the axis of the cylinder whenever the cylinder is actuated by a key 31.

Disposed in the upper end of the vertical transverse slot 21 is a detent 28 made in the form of a latch plate which is U-shaped in elevation the lower margin of which is wedge-shaped, fashioned to conform to the contour of the teeth 19 of the rack on the lever or bar 17. Within the central portion of the detent 28 is a spring 29 which, at one end, bears against the underside of the head of the supporting member 12, and at the other end against the detent, as may be observed in Figures 1, 2 and 3. The spring 29 functions to urge the detent 28 downwardly in the slot 21.

When the parts are assembled, the lever or bar 17 is inserted through the aperture 16 of the supporting member 12, with its teeth 19 uppermost, for engagement with one of them by the detent 28. This construction brings the milled slot 20 at what is then the bottom of the lever or bar 17 in alignment with the arc of oscillation of the cam disc 27 on the cylinder lock.

Figure 2 illustrates the engagement of the detent 28 with one of the teeth 19 of the rack of the lever or bar 17 and the cam disc 27 engaged in the slot 20. With the parts as thus arranged, the lever or bar 17 may be moved to the right, as viewed in Figure 1, by a pulling action imposed on its handle 18, to set or apply the brakes.

It is to be noted that the lever or bar 17 may be pulled to apply the brakes whether or not the cam disc 27 is entered in the slot 20 of the lever 17.

When it is desired to release the brakes, after lever or bar 17 has been pulled to apply the brakes, the handle 18 is given a turn to thus turn the lever or bar 17 about its longitudinal axis and thus disengage the detent 28 from the rack, the operator holding the handle 18 in the turned direction to push the lever or bar to the left to release the brakes, the bar being moved inwardly to fully release the brakes, whereupon the handle 18 is then turned to lie in a vertical plane, whereupon the detent 28 will engage a notch 19 of the rack directly under it.

When a brake lever of the push-pull type is pulled out to apply the brakes, the handle thereof is in a position where it may accidentally be struck by a leg of the driver leaving or entering the vehicle, or turned by a child and thus accidentally release the brakes.

To guard against accidental release of the brakes, locking means are provided.

The illustrated form of locking means includes the cam disc 27 movable into and out of the slot 20 in the lever or bar 17.

When the cylinder lock 25 has been actuated by key 31 to move the disc 27 into engagement with the slot 20, the parts appear shown in Figures 1 and 2, which is the locked position of the parts. When the cam disc is entered in the slot it is, of course, impossible to turn the lever or bar 17 sufficiently to disengage the detent 28 from the rack tooth in which it is at the time engaged.

It is to be observed that the cam disc 27 may be moved into locking position while the lever or bar 17 is in its "Off" position, as shown in Figure 1. Thus when the lever or bar is moved to apply the brakes, it may be pulled outwardly to cause engagement of the detent 28 with one of the teeth of the racks to thereby latch the lever in brake setting or holding position.

As long as the cam disc 27 is engaged in the slot 20 of the lever or bar 17 the bar cannot be turned or rotated to disengage it from its latched position.

When it is decided to release the brakes the cylinder lock is actuated by the key 31 to withdraw the cam disc 27 from engagement with the slot 20 in the bar, moving the cam disc to the position shown in Figure 3. When the cam disc 27 is free of the slot 20 in the bar, the bar may then be turned to disengage the detent from a ratchet tooth, as shown in Figure 3, and the bar returned to "Off" position.

A cable 31 is connected to the inner end of the lever or bar 17, in any suitable manner to thus connect the lever or bar to the brake system of the vehicle.

In order to provide extended bearing surface for the inner end of the tube 14, a ring 34 may be secured to or formed as a part of bearing plate 13. With such construction the bearing plate 13 may be made of thin material, thus reducing its cost of manufacture.

It will be observed that the brake lever structure of the present invention is one in which a push-pull type of lever may be locked when the brakes are set against accidental or unauthorized release movement.

The disposition of the brake lever below the instrument panel and the association of the key operated lock in the brake support makes it possible to manufacture and assemble the parts at low cost. Also with the key operated lock in the support partially conceals the lock but at the same time makes it accessible to the vehicle operator.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a direct pull brake lever structure, an elongated longitudinally movable member, ratchet teeth on one surface of said elongated member, a support housing for guiding the longitudinal movement of said elongated member, said elongated member having a longitudinal slot in a surface thereof opposite to the ratchet teeth and substantially coextensive with the longitudinal extent of said ratchet teeth, a disc member pivotally mounted for movement into said slot to prevent rotation of said elongated member but permitting longitudinal movement thereof.

2. In combination in a direct pull brake lever assembly for use in an automobile, a pull rod, a housing having a flange portion for attachment to a fixed portion of said automobile, a tubular portion for guiding the movement of said pull rod and a support portion extending laterally from said tubular portion, a key controlled disc member journaled in said support portion, ratchet teeth disposed across one surface of said rod, pawls carried by said housing engageable with said ratchet teeth for holding the pull rod in incremental brake setting position within the housing, the pull rod being rotatable to clear the ratchet teeth from the pawls, a longitudinal slot in said pull rod substantially coextensive with said ratchet teeth, said disc member being movable into said elongated slot to prevent rotation of said pull rod to pawl releasing position while permitting longitudinal movement of said pull rod to further brake setting position.

3. In a direct pull brake lever assembly, a support housing adapted to be attached to a convenient portion of the inside of an automobile, a pull rod rotatably and longitudinally reciprocably supported by said housing, the pull rod being attachable at its forward end to a brake setting cable and having a handle at its other end extending rearwardly from said housing, the housing and the pull rod having interengageable means operable in one rotary position of the pull rod for retaining the pull rod in brake setting position to which the pull rod is pulled rearwardly by the handle while in said rotary position, said means being disengageable by rotation of the pull rod to another position for returning the pull rod forwardly to non-brake setting position with respect to the housing, and locking means carried by said housing in position for ready access including a member movable toward and away from the pull rod, the pull rod having a longitudinal radially opening slot therein extending throughout the range of maximum rearward movement of the pull rod relative to said locking member for brake setting purposes, said locking member engaging in said slot to hold the pull rod against turning throughout the full range of the brake setting rearward movement of the pull rod, and means to retract said locking member from said slot at will to release the pull rod for rotary movement into the position wherein said interengaging means are released for return of the pull rod to forward brake releasing position.

DON S. DEVOR.

REFERENCES CITED

The following references are of record in the file of this patent:

UNITED STATES PATENTS

| Number | Name | Date |
|---|---|---|
| 1,238,989 | Cooper | Sept. 4, 1917 |
| 1,650,765 | Mercer | Nov. 29, 1927 |
| 2,256,697 | Weber | Sept. 23, 1941 |
| 2,295,792 | Jondus | Sept. 15, 1942 |